April 16, 1957   T. E. CURTIS ET AL   2,789,260
MOTOR CONTROL SYSTEM FOR LEVELING DEVICE
Filed Aug. 2, 1954   2 Sheets-Sheet 1
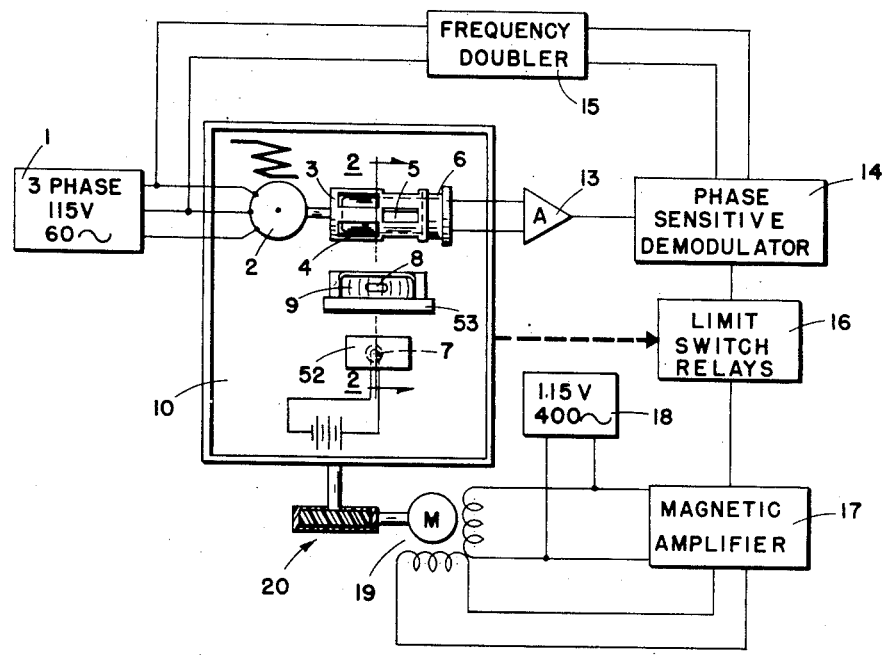
FIG. 1
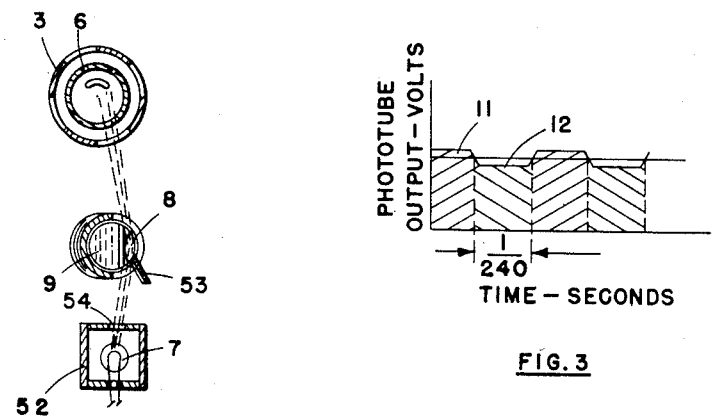
FIG. 2
FIG. 3
INVENTORS
THOMAS E. CURTIS
BY WALTER L. PONDROM, JR.
ATTORNEY INVENTORS
THOMAS E. CURTIS
WALTER L. PONDROM, JR.
BY
William R. Lane
ATTORNEY United States Patent Office 2,789,260
Patented Apr. 16, 1957

2,789,260
MOTOR CONTROL SYSTEM FOR LEVELING DEVICE

Thomas E. Curtis, Downey, and Walter L. Pondrom, Jr., Whittier, Calif., assignors to North American Aviation, Inc.

Application August 2, 1954, Serial No. 446,990

6 Claims. (Cl. 318—32)

This invention pertains to a device for electronically indicating deviation from the earth's gravity vector and the direction of departure therefrom; and, more particularly, it relates to a device for the alignment of equipment with respect to local level.

It is desired in certain applications that the direction of the local gravity vector be defined to within one second of arc. Means utilized for defining this vector, such as mercury-capacitive cells do not produce satisfactory results. Other devices involving the use of pendulums do not afford an easy and simple solution to the problem. Various problems such as response time, calibration, and instrumentation render these solutions inadequate.

The device of the invention utilizes a light, a bubble tube, a light chopper, and a phototube to provide electrical signals as to the alignment of the bubble tube or the equipment. In an automatically controlled system, the output of the phototube can be used to align a given piece of equipment within two seconds of arc. By reason of the novel method of chopping the light input to the phototube, the output of the phototube represents both magnitude and direction of departure from local level. Departure from local level in an opposite direction results in a phase-shift of 180° of the output of the phototube. The drive responsive to the output of the phototube, therefore, can be made to operate reversibly (in accordance with the phase shift) to correct the level of a given piece of equipment. Further, the use of a single phototube eliminates variations or calibrations involved due to the differences between phototubes. Therefore, drift due to variations in phototube sensitivities, inherent in a system using two phototubes, is eliminated.

It is therefore an object of this invention to provide an improved leveling device.

It is a further object of this invention to provide an electronic device indicating departure from local earth gravity vector and direction of departure.

It is a further object of this invention to provide an automatic leveling system in accordance with a bubble tube.

It is a further object of this invention to provide an electrical signal indicating by its magnitude the amount of departure from local gravity vector and by its phase the direction of departure from local gravity vector.

It is a further object of this invention to provide a method of modulating the input of the phototube in accordance with the magnitude and direction of deflection of the bubble in a bubble tube.

Further objects and features of the invention will become apparent from the following description, in which:

Fig. 1 is a plan diagram of the system;

Fig. 2 is a section taken on line 2—2, Fig. 1;

Fig. 3 is a graph of a typical output wave of the phototube; and

Figure 4:
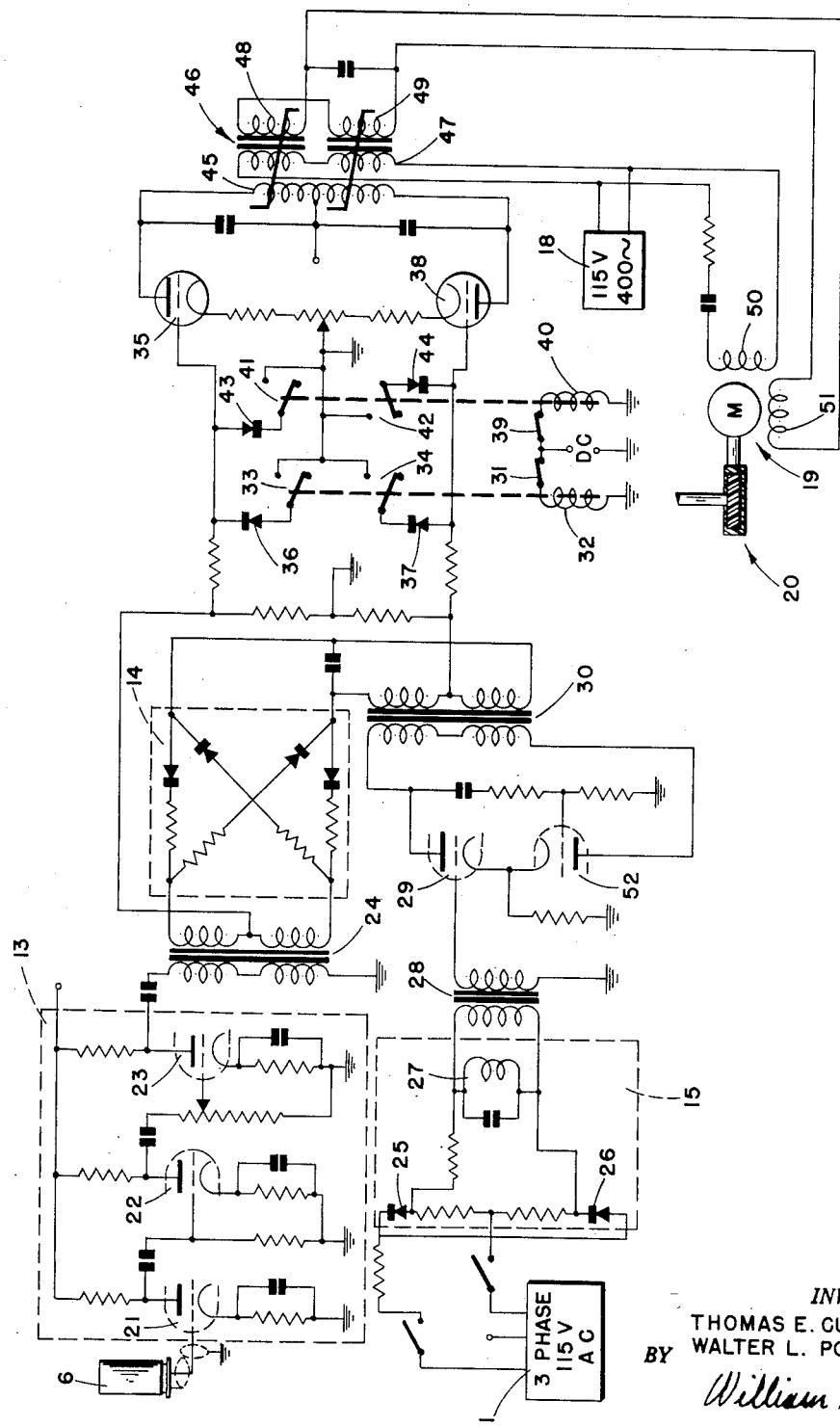
Fig. 4 is a schematic diagram of the electron tube amplifier, demodulator, magnetic amplifier, and the various interconnections.

Referring to Fig. 1, a three phase A.-C. source 1 drives synchronous motor 2 at constant speed, rotating mechanical chopper 3 having four pairs of apertures such as 4 and 5 which allow light to reach light sensitive means, such as phototube 6. Light is received through a slot in cover 52 from lamp 7. The slot in cover 52 extends approximately the length of apertures 4 and 5. The light passes through bubble tube 9 and is received by photocell 6 through apertures 4 and 5 which cause it to be modulated. Strip 53 shields phototube 6 from light which skirts the bubble tube 9. The bubble tube has a large radius of curvature in order to indicate slight deviations from local level. Light passing through the bubble is less attenuated than light passing through the opaque or semi-transparent fluid. The entire leveling device 10 is firmly attached to the equipment to be aligned. As the equipment and level sensing device 10 departs from level, bubble 8 moves to the left or right in bubble tube 9, and phototube 6 receives more light through one of the apertures 4 or 5 than through the other aperture. As the chopper rotates, photocell 6, therefore, provides an alternating output depending on the difference in light received through apertures 4 or 5 which, in turn, depends on the departure from level. With reference to aperture size, an optimum relationship is acquired when the chord of the aperture arc equals the diameter of the cathode of the phototube. Also, in order to prevent an irregular waveform from being generated by phototube 6, the interval when light is received through one aperture slightly overlaps the interval when light is being received through the other.

Fig. 2 is a section taken on line 2—2, Fig. 1, indicating relative position of chopper 3, phototube 6, bubble tube 9, strip 53, and light source 7. Slot 54 in cover 52 directs the light to pass through bubble tube 9.

In further explanation, Fig. 3 represents the modulated output provided by phototube 6, for example, in which the apertures on the left of chopper 3 are receiving more light than apertures on the right. As aperture 4 passes, phototube 6 receives an increased amount of light and generates a voltage indicated at 11 in Fig. 3. In the next 1/240 of a second, phototube 6 receives less light (through aperture 5) and generates an electrical output indicated by 12. The amplitude of the wave generated by half-cycles 11 and 12 is dependent upon the difference in light being received through apertures 4 and 5. Assuming, in a second example, that the level departs from vertical in an opposite direction, aperture 5 would be receiving more light than aperture 4. Half cycle 12 would be greater than half cycle 11 and, in effect, the wave form of Fig. 3 would be displaced 180°. This phase shift would be indicative of the direction of departure from vertical. Amplifier 13 increases the signal level and drives phase sensitive demodulator 14, Fig. 1. It takes the passing of two apertures to complete one cycle of the output signal. If synchronous motor 2 is driven at 1800 R. P. M. and there are four pairs of apertures on chopper 3, the output frequency of phototube 6 is 120 cycles per second. A frequency doubler 15 connected to 60 cycle input source 1 provides a 120 cycle reference frequency for phase sensitive demodulator 14.

It is desirable that limit switches be incorporated to prevent leveling device 10 from being driven too far in any particular direction. Such precaution is indicated in Fig. 1 functionally by limit switch relays, block 16, operated by level device 10, to control the output of demodulator 14 to magnetic amplifier 17. A 115 volt, 400 cycle A.-C. source excites the fixed phase winding of two-phase motor 19 and magnetic amplifier 17. Magnetic amplifier 17 excites the control phase winding of motor 19 in accordance with the output received from phase sensitive demodulator 14. Motor 19 is reversible according to the output of magnetic amplifier 17 and through worm gear 20 acts to drive leveling device 10 in a manner to level bubble tube 9.

Referring now to Fig. 4, the photocell output is received at amplifier 13 which is composed of three successive amplifying tubes 21, 22 and 23. Transformer 24 couples the output signal of amplifier 13 into diode demodulator 14. Diodes 25 and 26 receive the output of source 1 and provide full wave rectification having a frequency component double that of source 1. If, for example, source 1 has a frequency of 60 cycles, the output of diodes 25 and 26 is 120 cycles; and R-C circuit 27, tuned to resonance at 120 cycles, provides a double frequency reference signal to transformer 28. Tubes 29 and 52 further amplify the signal and transformer 30 couples the reference signal into ring demodulator 14 to make it phase sensitive. This frequency-doubled signal is utilized to determine the phase of the input signal to demodulator 14 from transformer 24. The output of the demodulator is taken from the center tap of the secondary of transformer 30, and the center tap of the secondary of transformer 24, and is polarity reversible depending on the relative phase between the input signal to demodulator 14 and the reference signal received through transformer 30.

Limit switch 31 is located with respect to the leveling device so that at the clockwise limit of travel of the leveling device, the limit switch is opened de-energizing the relay coil 32. Switches 33 and 34 are at that time caused to close. Positive signals can continue to pass to the grid of triode 35 (assuming signals of this sense cause the leveling device to be driven away from its clockwise limit). Diode 36 will act to short out only the negative signals to the grid of tube 35 (these being the signals which attempt to drive the device past its clockwise limit). At the same time, because of diode 37, positive signals cannot pass to the grid of triode 38 (signals of this sense attempting to drive the leveling device beyond its clockwise limit) and negative signals are still allowed to pass to the grid of triode 38 (signals of this sense causing the leveling device to be driven away from its clockwise limit). To provide a counterclockwise limit stop, limit switch 39 is opened at the counterclockwise limit of travel de-energizing coil 40, closing relay switches 41 and 42. Diodes 43 and 44 allow only negative signals to be received at tube 35 and positive signals at tube 38 (which are in a sense to drive the leveling device away from its counterclockwise limit).

The plate currents of tubes 35 and 38 operate a control winding 45 of magnetic amplifier 46. Power is received at the magnetic amplifier through winding 47 from A.-C. source 18. The fixed phase winding 51 of motor 19 also receives power from A.-C. source 18. Output windings 48 and 49 provide a phase reversible output to control phase winding 51 of motor 19.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a level indicating device, a bubble tube, a light source, light sensitive means disposed to receive light from said light source through said bubble tube, and a chopper interposed between said light source and said light sensitive means, said chopper having at least one pair of apertures laterally disposed with respect to each other so as to allow light to reach said light sensitive means through said apertures alternately.

2. In a level indicating device, a light source, a bubble tube, a chopper having at least one pair of apertures disposed to alternately receive light in equal or unequal amounts through said bubble tube depending on the deflection from level of said bubble tube, and light sensitive means disposed to receive the light passing through said apertures.

3. In a level indicating device, a light source, a bubble tube, light sensitive means disposed to receive light from said light source through said bubble tube, a rotatable, cylindrical chopper encircling said light sensitive means, said chopper having at least one pair of laterally disposed apertures located so as to allow light to reach said light sensitive means alternately through said apertures upon rotation of said chopper.

4. In an automatic leveling device, a light source, a bubble tube, a chopper having at least one pair of apertures adapted alternately to pass the light received from said light source, said apertures located to pass equal amounts of light when said bubble tube is level and unequal amounts when said bubble tube is not level, light sensitive means disposed to receive the light passed by said apertures, phase sensitive means connected to receive the output of said light sensitive means, reversible motor means responsive to the output of said phase sensitive means to drive said automatic leveling device.

5. An automatic leveling device comprising a light source, a bubble tube, light sensitive means disposed to receive the light through said bubble tube, a chopper having laterally disposed apertures adapted to alternately allow light to pass to said light sensitive means, a synchronous motor adapted to drive said chopper, phase sensitive means connected to receive the output of said photocell, frequency multiplying means connected to receive the input frequency of said synchronous motor and to provide a reference frequency to said phase sensitive demodulator, a phase reversible motor connected to receive the output of said phase sensitive means and drive means connected from said motor to said leveling device.

6. In an automatic leveling device, a light source, a bubble tube, light sensitive means disposed to receive the light through said bubble tube, chopping means having laterally disposed apertures disposed to alternately allow equal or unequal amounts of light from said light source to reach said light sensitive means according to the position of the bubble in said bubble tube, a synchronous motor operating said chopper, phase sensitive demodulator means connected to receive the output of said light sensitive means, frequency multiplying means connected to receive the input frequency of said synchronous motor and provide a reference frequency to said phase sensitive demodulator or amplifier connected to receive the output of said demodulator, a two-phase motor responsive to the output of said amplifier, gear drive means connected to drive said leveling device in accordance with the output of said motor.

References Cited in the file of this patent

UNITED STATES PATENTS

| | | |
|---|---|---|
| 1,996,233 | Darrah | Apr. 2, 1935 |
| 2,268,017 | Busick et al. | Dec. 30, 1941 |
| 2,427,902 | Clifton et al. | Sept. 23, 1947 |
| 2,446,096 | Moore | July 27, 1948 |
| 2,515,054 | Pagliarulo | July 11, 1950 |